(12) United States Patent
Bazot et al.

(10) Patent No.: US 7,904,948 B2
(45) Date of Patent: *Mar. 8, 2011

(54) SYSTEMS FOR PROTECTING SUBSCRIBER IDENTIFICATION BETWEEN SERVICE AND CONTENT PROVIDERS

(75) Inventors: Philippe Bazot, Vence (FR); Fabrice Livigni, Mougins (FR); Jacques Cresp, Saint Jeannet (FR); Richard Sert, Frejus (FR)

(73) Assignee: International Business Machines Corporation, Armonk, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 12/249,118

(22) Filed: Oct. 10, 2008

(65) Prior Publication Data

US 2009/0094454 A1  Apr. 9, 2009

Related U.S. Application Data

(63) Continuation of application No. 10/681,613, filed on Oct. 8, 2003, now Pat. No. 7,480,935.

(30) Foreign Application Priority Data

Oct. 10, 2002  (EP) ..................................... 02368112

(51) Int. Cl.
*G06F 7/04* (2006.01)
(52) U.S. Cl. ................................ 726/9; 713/185; 726/20
(58) Field of Classification Search .......... 713/168–170, 713/181–185; 726/9, 10, 20, 27–30, 2, 5, 726/6, 4; 380/255, 262, 268, 36, 43; 709/223, 709/225, 229; 705/50, 51
See application file for complete search history.

(56) References Cited

U.S. PATENT DOCUMENTS

| | | | |
|---|---|---|---|
| 5,646,998 | A | 7/1997 | Stambler |
| 5,796,841 | A | 8/1998 | Cordery et al. |
| 5,825,881 | A | 10/1998 | Colvin, Sr. |
| 5,850,442 | A | 12/1998 | Muftic |
| 5,903,878 | A | 5/1999 | Talati et al. |
| 6,336,095 | B1 | 1/2002 | Rosen |
| 6,463,534 | B1 | 10/2002 | Geiger et al. |
| 6,553,412 | B1 | 4/2003 | Kloba et al. |
| 6,892,307 | B1 | 5/2005 | Wood et al. |
| 6,957,185 | B1 | 10/2005 | Labaton |
| 7,100,044 | B2 | 8/2006 | Watanabe et al. |
| 7,103,676 | B2 | 9/2006 | Payrits et al. |
| 7,171,475 | B2 | 1/2007 | Weisman et al. |
| 7,185,364 | B2 | 2/2007 | Knouse et al. |
| 7,194,664 | B1 | 3/2007 | Fung et al. |
| 2003/0191719 | A1 | 10/2003 | Ginter et al. |
| 2004/0030615 | A1 | 2/2004 | Ling |

*Primary Examiner* — Nirav Patel
(74) *Attorney, Agent, or Firm* — Andrea Bauer; Hoffman Warnick LLC

(57) ABSTRACT

A method and systems for protecting the identification of a subscriber when a service provider transmits a subscriber request to a content provider in a distributed network environment, such as Internet. After the user sends a request to a service provider to which he has subscribed, the service provider encrypts the user identifier before transmitting this request with the encrypted user identifier to the content provider. Upon reception, the content provider uses an authentication Web Service supplied by the service provider for certifying the user identifier. If the user identifier is certified, the content provider transmits the requested content to the service provider, which formats it before sending it to the user. The content provider may charge the user through the service provider.

2 Claims, 3 Drawing Sheets

SYSTEMS FOR PROTECTING SUBSCRIBER IDENTIFICATION BETWEEN SERVICE AND CONTENT PROVIDERS

This continuation application claims priority to U.S. patent application Ser. No. 10/681,613 entitled METHOD AND SYSTEMS FOR PROTECTING SUBSCRIBER IDENTIFICATION BETWEEN SERVICE CONTENT PROVIDERS, filed on Oct. 8, 2003, now U.S. Pat. No. 7,480,935, the contents of which are hereby incorporated by reference in their entirety.

FIELD OF THE INVENTION

The present invention relates generally to the identification protection of a subscriber of a distributed network environment, such as the Internet, and more specifically to a method and systems for securely and anonymously transferring subscriber identification between service and content providers.

BACKGROUND OF THE INVENTION

The service provider (SP) market has moved up the value chain from pure connectivity services to deliver value-added and revenue generating services. The business model of a service provider, which was initially driven by minutes of use, is being increasingly replaced by data traffic generated by users that access external services through an increasing variety of devices. In addition to growing their customer bases, service providers are now looking to increase the average revenue per user to boost revenues. More compelling services such as content, commerce, and applications promise higher profit margins, improved customer retention, and greater customer satisfaction. However, managing and distributing these third-party content services present significant challenges to service providers.

At the same time, content providers (CPs) are quickly becoming experts in digitally managing and distributing their content, but still face the challenge of establishing independent relationships with end users. To successfully generate revenue through digital content assets, both service and content providers need a solution that leverages their complementary strengths while protecting their respective assets.

In this context, emerging Web Services technologies will play a key role in the management of the Business to Business (B2B) relationship between the SPs and CPs. As the Web did for program-to-user interactions, Web Services will do for program-to-program interactions. Web Services allow companies to reduce the cost of doing e-business, to deploy solutions faster, and to open up new opportunities. The key to reaching this new horizon is a common program-to-program communications model, built on existing and emerging standards such as HTTP, eXtensible Markup Language (XML), Simple Object Access Protocol (SOAP), Web Services Description Language (WSDL) and Universal Description, Discovery and Integration (UDDI). Web Services allow applications to be integrated more rapidly, easily, and less expensively than ever before. They provide a unifying programming model so that application integration inside and outside the enterprise can be done with a common approach.

In today's market, a service provider generally aggregates content from multiple content providers and therefore multiplies its partnerships with CPs. In order to ease integration with these different CPs, the SP delegates an increasing number of authentication and authorization tasks to the CPs. These tasks could be done in different ways:

- no authentication process is done by the CPs site to deliver its content to the SP. However, this business model does not seem to be very realistic.
- a user registry is available on the CP sites which implies that the CPs need to build and maintain their own subscriber registry. On one hand, this solution increases the amount of business process on the CP side and therefore cost, and on the other hand, either the SP has to deliver protected or confidential data about the subscribers, which might not be part of its business policy, or the user has to be registered on both sides, SP and CP, which might not be convenient for the end-user.

SUMMARY OF THE INVENTION

Thus, it is a broad object of the invention to remedy the shortcomings of the prior art as described above.

It is another object of the invention to provide a method and systems adapted to protect service provider subscriber registries.

It is a further object of the invention to provide a method and systems that do not require content providers to build and maintain their own subscriber registries.

It is a further object of the invention to provide a method and systems adapted to protect user privacy when a user obtains content other than that provided by the user's service provider.

It is still a further object of the invention to provide a method and systems adapted to prevent subscribers from having to enroll with every external content provider, and to prevent subscribers from having to provide personal and/or sensitive information to content providers that may be considered as not trustworthy.

It is still a further object of the invention to provide a method and systems adapted to supply a Web Services based mechanism to allow content providers to validate a subscriber's identity prior to downloading content to that subscriber.

The accomplishment of these and other related objects is achieved by a method for protecting an identifier of a subscriber during data transfer between a service provider and a content provider when said subscriber sends a request to said service provider to obtain data belonging to said content provider, the method comprising the steps of:

upon reception of said subscriber request by said service provider:

computing an encrypted token using said identifier of said subscriber; and, transmitting said subscriber request and said encrypted token to said content provider;

upon reception by said service provider of a certification request comprising an encrypted token, sent by said content provider:

extracting said encrypted token from said certification request;

decrypting said extracted encrypted token to determine the subscriber identifier;

checking said determined subscriber identifier; and, transmitting a success or failure indication to said content provider in response to said certification request;

upon reception of said data belonging to said content provider, transmitting said data belonging to said content provider to said subscriber.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 2, comprising

DETAILED DESCRIPTION OF THE INVENTION

According to the invention, CPs use the SP's user registry to prevent the end-user from having to enroll (or to be enrolled by batch process for instance) several times with different CPs, in order to be authorized to download content from their sites. This drastically reduces the cost of the business process on the CP side. However, since CPs need to make sure of the subscription and of the authorization of the end-user requesting specific content towards the SP platforms, a user identifier, referred to as a user Id in the following description, must be transferred and shared in the communication process between the CPs and the SPs. For that purpose, the end-user can be assigned an identification symbol, statically or dynamically.

Static assignment allows CPs to perform some statistical and user behavior analysis, such as "The user X accesses the application on a daily basis between 9:00 and 10:00." Static assignment is easier to handle, but it will not prevent user analysis. However, it can prevent a user's behavior from being correlated to the actual user. Dynamic assignment prevents user analysis, and therefore adds additional security to the SP subscriber registry because it completely ensures end-users privacy by preventing the content provider from generating statistical information about subscriber interests. As a consequence, a preferred embodiment of the invention is based on dynamic assignment.

The invention provides a scaleable and secure solution for sharing trustable subscriber identification between a SP and a CP, thus providing the necessary base for a revenue sharing business model. The solution is based on the generation and transmission of an anonymous subscriber token with every request, such as HTTP requests, going to external services managed by the SP, and a mechanism, installed and maintained on the SP side, to allow a CP to validate the subscriber token prior to downloading valuable content.
The invention provides a secure method that allows a SP to deploy a common architecture to integrate CPs more rapidly, easily and less expensively than before:
  by sending an encrypted token, preferably a dynamic encrypted token, with each request going to the CPs who share a contract with the SP,
  by publishing/providing a Web Service based mechanism allowing the CP to use the encrypted token sent by the SP in order to validate, authorize and, for example, in case of revenue-sharing business model, bill the end-user prior to downloading content.
This overall mechanism guarantees 100% privacy of end-users regarding the CPs making each request anonymous and at the same time, allows the SP to control the validity of user information sent by the CP by using standard key encryption (symmetric or asymmetric key).

Figure 1:
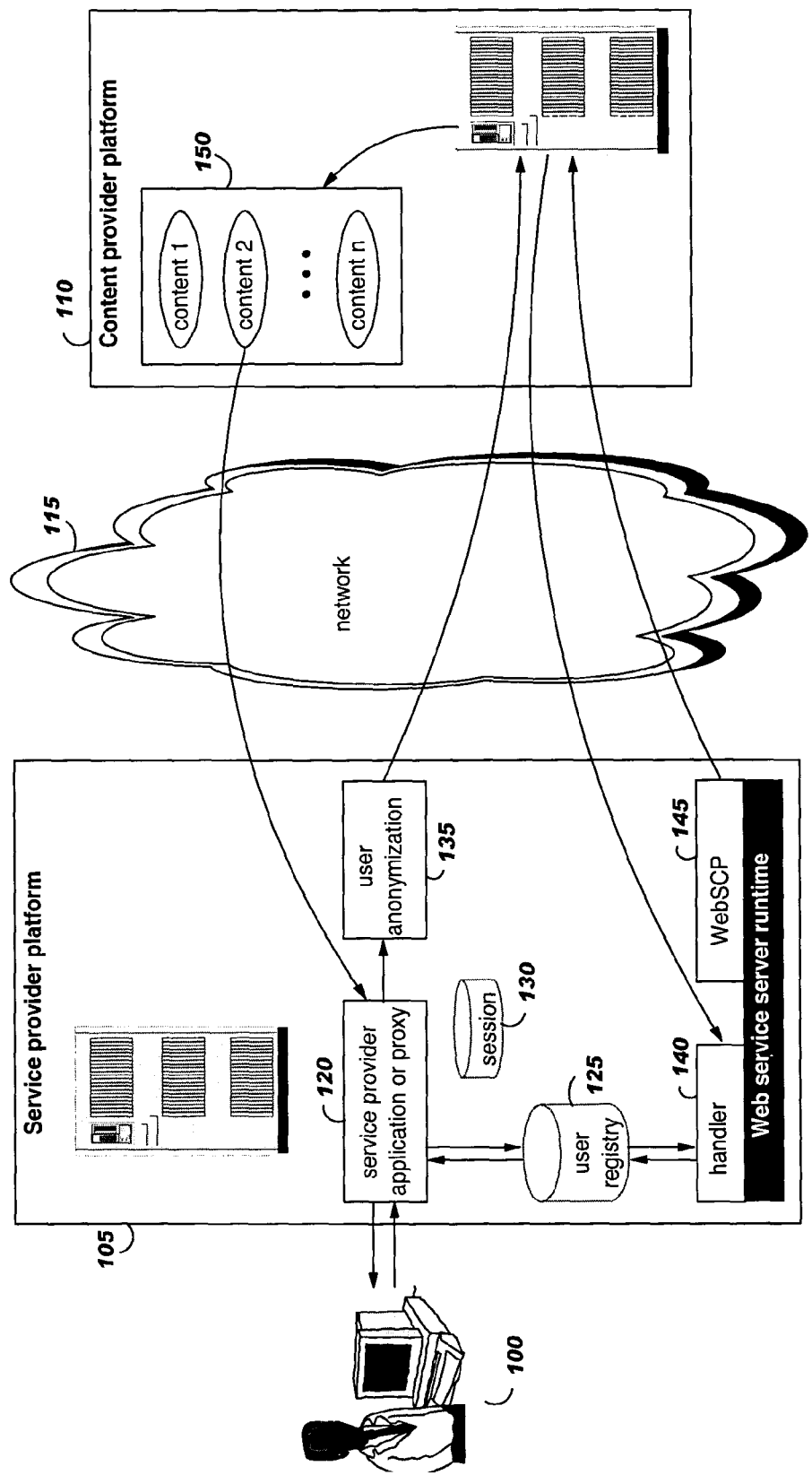
FIG. 1 is an example of a standard distributed network environment wherein the method of the invention is implemented.

FIG. 1 illustrates a typical exchange between an end-user, a SP and a CP when using the method of the invention. As shown, an end-user 100 is connected to a service provider platform 105 that is linked to a content provider platform 110 through a distributed network environment 115, such as the Internet. A single content provider is illustrated for sake of clarity. In the following description, it is assumed that authentication/authorization of the end-user by the SP has occurred.

End-user 100 may access an application of the service provider or an external service through a proxy 120, to obtain personalized content, e.g., news or a weather forecast, retrieved by the SP from a CP partner. The service provider platform 105 checks in its user registry 125 if the end-user 100 requesting such a service is "known" and has the authorization to obtain the requested data. A user management session 130 could be done at this point in the service provider platform 105 to prevent user registry access for each subsequent request.

Once the user has been authorized by the SP to access the requested external service, and before sending the request to the content provider platform, the SP generates an encrypted token from the user Id retrieved in the SP user registry 125 (user Id is a symbol that will uniquely identify the end-user 100) using an user anonymization mechanism 135 based on a standard key encryption algorithm. The algorithm used to generate an encrypted token is detailed by reference to FIG. 3. Then, the request is sent to the content provider platform 110, enriched with the encrypted token previously calculated, and stored in the corresponding user session. In such a case, this mechanism will guarantee that the same encrypted token will be used for each subsequent request during the same session. Obviously, a new encrypted token will be generated for another subsequent session of the same user making the user "anonymization" dynamic. The encrypted token lifetime is exactly the user session lifetime.

The CP uses a handler 140 and an authentication Web Service (WebSCP) 145 provided by the service provider through a request, e.g. a SOAP request. The CP has the responsibility to transfer the encrypted token as requested by the published Web Service interface. The encrypted token could be passed directly in the SOAP body or alternatively in a predefined SOAP header. The SOAP request could be securely transferred by using secure SOAP protocols. Before being processed by the Web Service endpoint, the SOAP request is intercepted by a SOAP handler 140, whose role is to decrypt the encrypted token using the appropriate key and to extract the user Id (the algorithm is described by reference to FIG. 4). SOAP handler 140 provides a generic mechanism for performing specific processing of any SOAP messages and acts as plug-in in a Web Service runtime environment. The user Id is checked by the authentication Web Service 145 using the SP user registry 125. Authentication Web Service 145 may also handle additional treatments such as the billing in real-time mode of the user. The WebSCP 145 sends back the SOAP response to the CP, indicating the success or failure of the operation.

Depending on the response status, the appropriate content extracted from the content provider platform storage 150 or an error message, is sent to the SP application or proxy 120 so as to be transmitted to the end-user 100, depending upon the CP response.

Figure 2A:
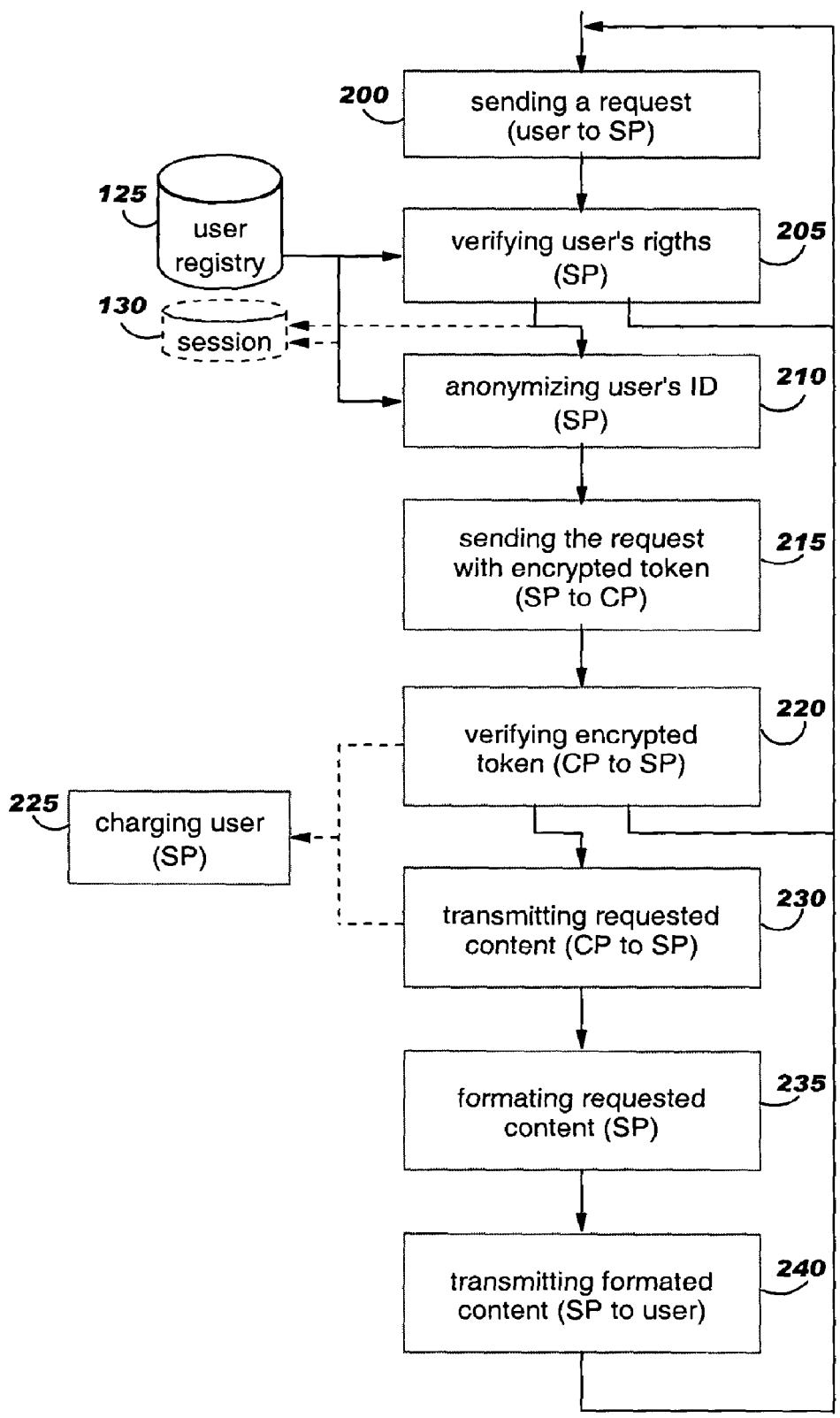
FIGS. 2a and 2b, illustrates the algorithm of the method of the invention.

FIG. 2a illustrates the algorithm of the invention to implement the method described above. When a user has established a connection with the SP to which the user has subscribed, the user may send a request to obtain particular data (step 200). The SP verifies the rights of the user (step 205) by looking at the user registry 125. If the user does not have the rights to obtain the requested data, the user is forewarned and may send another request. Else, if the user has the rights, the user Id is encrypted to "anonymize" the identifier of the user, using the algorithm described by reference to FIG. 3, producing an encrypted token (step 210). The encrypted token is preferably such that, even if it may be preserved during a particular session, a new one is computed at each session, e.g., at each connection. If the encrypted token is preserved during a session, it is stored in a session memory 130 of the SP. Then, the SP forwards the user request to the corresponding CP with associated encrypted token (step 215). When a CP receives a request with associated encrypted token, the CP verifies the user Id by sending a certification request to the SP from which the CP received the user request (step 220). The certification request may comprise an instruction for billing the user according to the requested data if the user Id is certified (step 225). If the SP does not certify the user Id, the user request is abandoned. Else, if the SP certifies the user Id, the CP transmits the requested data to the SP (step 230). At this stage, the CP may also send a request to the SP, different from the certification request, to charge the user an amount corresponding to the user request (step 225). Such a billing request, comprising the encrypted token, may be sent at anytime by the CP. Obviously, the billing operation is done only after user authentication, using the described mechanism. When received, the requested data is formatted by the SP and personalized, as needed by user, (step 235), prior to being transmitted to user (step 240). After receiving the requested data, the user may send another request.

Figure 2B:
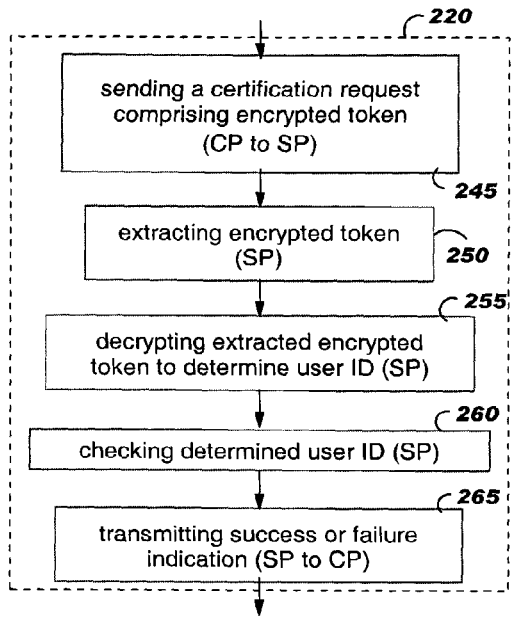

FIG. 2b details the mechanism used to handle the content provider certification request, i.e., the step of verifying the encrypted token (step 220). When the content provider receives a request comprising an encrypted token, a SOAP certification request is sent back to the service provider with the encrypted token (step 245). The encrypted token could be passed directly in the SOAP body or in a predefined SOAP header. Upon reception, the service provider extracts the encrypted token from the SOAP certification request (step 250) and decrypts this encrypted token (step 255) in the SOAP handler. The decrypted token, which should represent the identifier of a subscriber who sent a request, is checked using the user registry 125 (not represented) to determine whether or not it represents a connected subscriber having sent a request (step 260). Then, a success or failure indication is sent back to the content provider in a SOAP response (step 265).

As described above, extraction (step 250) and decryption (step 255) of the encrypted token are performed by handler 140, while certification (step 260) and other tasks such as billing are performed by the authentication Web Service 145 that transmits back the response (step 265) or, if required, an acknowledgment.

Figure 3:
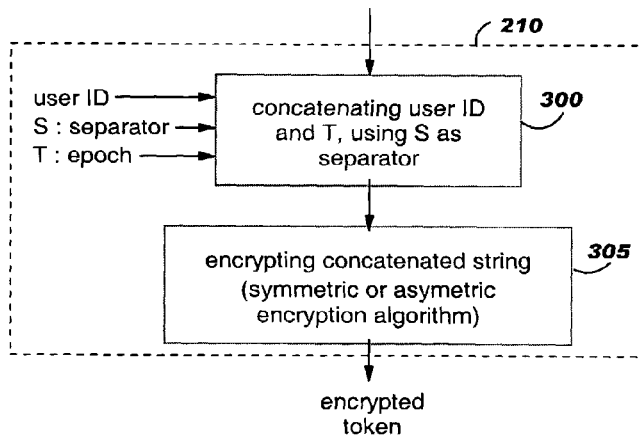
FIG. 3 shows an example of the algorithm used to compute an encrypted token that "anonymizes" user identifier during data transfer between service and content providers.

Now turning to FIG. 3, there is shown an example of the algorithm used to generate dynamically an encrypted token, i.e., the step of anonymizing the user Id (step 210). After having determined a separator, referred to as S, and a variable T which, in this example, corresponds to the time expressed in number of milliseconds from the standard base time known as the epoch, namely Jan. 1, 1970, 00:00:00 GMT, the user Id is concatenated with variable T in a string, such that the user Id and T are separated with separator S (step 300). Then, the string is encrypted according to a standard symmetric or asymmetric encryption algorithm (step 305) to produce the encrypted token. It should be noted that the variable T may be any time varying value. Thus, for a particular user, the encrypted token could be different at each connection, preventing the CP from gathering any statistics based on the encrypted token.

Figure 4:
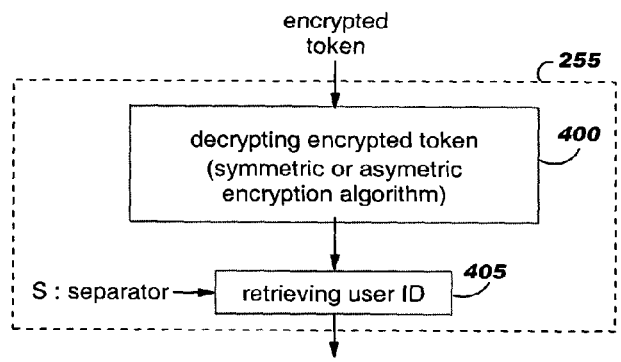
FIG. 4 illustrates an example of the algorithm used to extract a user identifier from an encrypted token so that the service provider may certify the user identifier.

FIG. 4 illustrates an example of the algorithm used to decrypt the encrypted token to extract the user Id, i.e., the step of decrypting extracted encrypted token (step 255). Upon reception of the encrypted token, it is decrypted using the decryption algorithm corresponding to the encryption algorithm used to produced the encrypted token (step 400). Since, the decryption process is done by the SP, the encryption/decryption algorithm may be indifferently symmetric or asymmetric; no key has to be transmitted through the network. When the encrypted token has been decrypted, the user Id is easily retrieved by using the separator S (step 405) so that the SP may check whether or not the user Id belongs to the user registry.

Thus, the method of the invention provides:
user identity key generation that guarantees the privacy of the user from a CP standpoint (the CP is unable to identify the user nor to generate useful statistic information related to the identity of the user), and uniqueness from the SP standpoint (the SP is able from this key to retrieve the real identity of the user).
use of a Web Service technology to publish and provide a service to validate the user identity key, as well as potential additional functions such as billing.

Naturally, in order to satisfy local and specific requirements, a person skilled in the art may apply to the solution described above many modifications and alterations all of which, however, are included within the scope of protection of the invention as defined by the following claims.

The invention claimed is:

1. An apparatus for protecting an identifier of a subscriber, during data transfer between a service provider and a content provider, when said subscriber sends a request to said service provider to obtain data belonging to said content provider comprising:
at least one computer for performing the following steps:
dynamically generating for each new session an encrypted token using said identifier of said subscriber, wherein a lifetime of the encrypted token is a user session lifetime, the generating using one of a symmetric and asymmetric encryption algorithm comprising:
determining a separator (S);
determining a time varying value (T);
concatenating the subscriber identifier with T in a string such that the subscriber identifier and T are separated with S;
encrypting the string with one of a symmetric and asymmetric encryption algorithm; and,
transmitting said subscriber request and said encrypted token to said content provider;
extracting said encrypted token from said Simple Object Access Protocol (SOAP) certification request, wherein the encrypted token is in one of the SOAP body and a predefined SOAP header;
decrypting said extracted encrypted token using a decryption algorithm corresponding to the encryption algorithm;
retrieving the subscriber identifier using the separator;
checking said determined subscriber identifier; and,
transmitting a success or failure indication to said content provider in a SOAP response to said certification request;
transmitting said data belonging to said content provider to said subscriber;

memorizing said encrypted token so that it can be reused during the user session lifetime without having to be recomputed; and formatting said data belonging to said content provider in a format suitable and usable by the subscriber.

2. A method for enabling a computer system to protect an identifier of a subscriber, during data transfer between a service provider and a content provider, when said subscriber sends a request to said service provider to obtain data belonging to said content provider, the method comprising:

executing on at least one computer the steps including:

upon reception of said subscriber request by said service provider for each new subscriber session:

dynamically generating for each new session an encrypted token using said identifier of said subscriber, wherein a lifetime of the encrypted token is a user session lifetime, the generating using one of a symmetric and asymmetric encryption algorithm comprising:

determining a separator (S);

determining a time varying value (T);concatenating the subscriber identifier with T in a string such that the subscriber identifier and T are separated with S;

encrypting the string with one of a symmetric and asymmetric encryption algorithm; and, transmitting said subscriber request and said encrypted token to said content provider;

upon reception by said service provider of a Simple Object Access Protocol (SOAP) certification request comprising an encrypted token, sent by said content provider:

extracting said encrypted token from said SOAP certification request, wherein the encrypted token is in one of the SOAP body and a predefined SOAP header;

decrypting said extracted encrypted token using a decryption algorithm corresponding to the encryption algorithm;

retrieving the subscriber identifier using the separator;

checking said determined subscriber identifier; and, transmitting a success or failure indication to said content provider in a SOAP response to said certification request;

upon reception of said data belonging to said content provider by said service provider, transmitting said data belonging to said content provider to said subscriber;

memorizing said encrypted token so that it can be reused during the user session lifetime without having to be recomputed; and formatting said data belonging to said content provider in a format suitable and usable by the subscriber.

* * * * *